United States Patent
Mori

(10) Patent No.: US 7,922,396 B2
(45) Date of Patent: Apr. 12, 2011

(54) DOUBLE ROW SELF-ALIGNING ROLLER BEARING AND MAIN SHAFT SUPPORT STRUCTURE OF WIND POWER GENERATOR

(75) Inventor: Nobuyuki Mori, Mie (JP)

(73) Assignee: NTN Corporation, Osaka (JP)

( * ) Notice: Subject to any disclaimer, the term of this patent is extended or adjusted under 35 U.S.C. 154(b) by 998 days.

(21) Appl. No.: 11/663,162

(22) PCT Filed: Sep. 20, 2005

(86) PCT No.: PCT/JP2005/017277
§ 371 (c)(1),
(2), (4) Date: Mar. 19, 2007

(87) PCT Pub. No.: WO2006/033320
PCT Pub. Date: Mar. 30, 2006

(65) Prior Publication Data
US 2007/0297706 A1    Dec. 27, 2007

(30) Foreign Application Priority Data

Sep. 21, 2004 (JP) .................. 2004-273029
Sep. 21, 2004 (JP) .................. 2004-273030
Oct. 1, 2004 (JP) .................. 2004-290240

(51) Int. Cl.
F16C 23/08 (2006.01)
F16C 33/34 (2006.01)
F16C 19/28 (2006.01)

(52) U.S. Cl. .................. 384/558; 384/450; 384/568

(58) Field of Classification Search .................. 384/450, 384/463, 484, 495, 558, 563, 568
See application file for complete search history.

(56) References Cited

U.S. PATENT DOCUMENTS

| 1,350,263 | A | * | 8/1920 | Palmgren | 384/568 |
| 3,910,656 | A | * | 10/1975 | Price et al. | 384/558 |
| 3,934,957 | A | * | 1/1976 | Derner | 384/563 |
| 4,227,754 | A | * | 10/1980 | Kellstrom | 384/450 |
| 4,345,800 | A | * | 8/1982 | Hofmann et al. | 384/450 |
| 4,557,613 | A | * | 12/1985 | Tallian et al. | 384/568 |
| 4,828,404 | A | * | 5/1989 | Takata | 384/568 |
| 4,916,750 | A | * | 4/1990 | Scott | 384/558 |
| 4,929,098 | A | * | 5/1990 | Takata et al. | 384/450 |
| 5,145,267 | A | * | 9/1992 | Takata et al. | 384/558 |
| 6,116,785 | A | * | 9/2000 | Kondo et al. | 384/463 |
| 6,296,395 | B1 | * | 10/2001 | Brand et al. | 384/558 |
| 6,814,494 | B2 | * | 11/2004 | Borowski et al. | 384/568 |
| 2005/0148425 | A1 | * | 7/2005 | Nakagawa et al. | 475/348 |

(Continued)

FOREIGN PATENT DOCUMENTS

GB         139512    *   7/1920

(Continued)

*Primary Examiner* — Marcus Charles
(74) *Attorney, Agent, or Firm* — Clark & Brody

(57) ABSTRACT

A double row self-aligning roller bearing in which spherical rollers are arranged in double rows between an inner ring and an outer ring, characterized in that the curvature radius of the ridge line of the spherical roller in one row is R1, the curvature radius of the ridge line of the spherical roller positioned in the other row is R2, the curvature radius of the inner ring track surface being in contact with the spherical roller in one row is N1, and the curvature radius of the inner ring track surface being in contact with the spherical roller in the other row is N2, a relation such that N1/R1>N2/R2 is satisfied.

11 Claims, 6 Drawing Sheets

U.S. PATENT DOCUMENTS

2007/0127858 A1 * 6/2007 Nakagawa et al. ........... 384/495

FOREIGN PATENT DOCUMENTS

| GB | 539502 | * | 9/1941 |
| GB | 2371603 A | * | 7/2002 |
| JP | 61-171917 | | 8/1986 |
| JP | 61171917 A | * | 8/1986 |
| JP | 1-224523 | | 9/1989 |
| JP | 04039414 A | * | 2/1992 |
| JP | 10-184677 | | 7/1998 |
| JP | 2000-356218 | | 12/2000 |
| JP | 2002-147449 | | 5/2002 |
| JP | 2003-130057 | | 5/2003 |
| JP | 2004-011737 | | 1/2004 |
| JP | 2004-019731 | | 1/2004 |
| JP | 2004-245251 | | 9/2004 |
| JP | 2004245251 A | * | 9/2004 |
| WO | WO 2004027277 A1 | * | 4/2004 |

* cited by examiner

DOUBLE ROW SELF-ALIGNING ROLLER BEARING AND MAIN SHAFT SUPPORT STRUCTURE OF WIND POWER GENERATOR

TECHNICAL FIELD

The present invention relates to a double row self-aligning roller bearing and more particularly, to a double row self-aligning roller bearing in which unequal loads are applied to spherical rollers in right and left rows and a main shaft support structure of a wind power generator comprising the above bearing.

BACKGROUND ART

Recently, wind power generation that uses clean and inexhaustible energy has attracted attention. Since a power generator body comprising a windmill is set at a height of several tens of meters in a case of a large wind power generation facility, a large amount of labor is needed and high risks are accompanied in maintaining the bearing that supports the main shaft of the blade of the windmill. Therefore, the bearing that supports the main shaft of the wind power generator requires high reliability and a long durable life.

A self-aligning roller bearing suitable for rotatably supporting the main shaft of the wind power generator has been disclosed in Japanese Unexamined Patent Publication No. 2004-11737, for example. As disclosed in this document, a large double row self-aligning roller bearing 1 shown in FIG. 1 is used as the bearing for supporting the main shaft in the large wind power generator in many cases.

As a main shaft 2 of a windmill of the wind power generator is mounted on a housing 4 so as to support the top end provided with a blade 3 in a cantilevered manner, the large self-aligning roller bearing 1 that can support the deflection of the main shaft 2 is used as a cantilever bearing. When the blade 3 receives wind force, the main shaft 2 rotates with the blade 3. This rotation of the main shaft 2 is speeded up by a speed-up gear (not shown) and transmitted to a power generator.

The self-aligning roller bearing 1 comprises an inner ring 5, and outer ring 6, and double row spherical rollers 7 and 8. While the power is generated by wind force, axial direction load (bearing thrust load) due to wind power applied to the blade 3 and a radial direction load (bearing radial load) due to self-weight of a blade shaft are applied to the main shaft 2 supporting the blade 3. Since the double row self-aligning roller bearing 1 can receive the radial load and the thrust load at the same time and has a self-aligning property, it can absorb the inclination of the main shaft 2 due to a precision error or a mounting error of the housing 4, and absorb the deflection of the main shaft 2 during operation.

The inner ring 5 shown in FIG. 1 has a center rib 9 abutting on end surfaces 7a and 8a of the spherical rollers in the right and left rows. When the end surfaces of the spherical rollers 7 and 8 have convex spherical configurations, in order to prevent the spherical rollers 7 and 8 from being skewed, both sides of the middle 9 have concave curved surfaces to be matched to the concave spherical configurations of the spherical rollers so that the contact area between both is increased in general.

According to the above double row self-aligning roller bearing 1 for supporting the main shaft of the wind power generator, the thrust load is higher than the radial load during the operation of the windmill. In this case, the spherical roller 8 in the row positioned farther from the blade 3 receives the radial load and the thrust load at the same time. As for the spherical roller 7 in the row positioned closer to the blade 3, the thrust load is not so much applied and only the radial load is applied to it.

Meanwhile, in a windless state, the load applied to the main shaft support bearing 1 is mainly the radial load. Therefore, the spherical roller 7 in the row positioned closer to the blade 3 receives a higher radial load in the windless state in which the windmill does not rotate, than the state in which the windmill rotates.

As described above, in the case of the double row self-aligning roller bearing 1 for supporting the main shaft of the wind power generator, since the spherical roller 8 in the row positioned farther from the blade 3 is highly loaded, its rolling fatigue life becomes short as compared with the spherical roller 7 in the row positioned closer to the blade 3. Especially, since the concave spherical configuration of the spherical roller 8 is in contact with the concave curved surface of the center rib 9 of the inner ring 5, the contact surface pressure is high, so that friction resistance is generated and a rotation torque is increased at the contact part. Furthermore, since the contact position is at the upper part of the side surface of the center rib, a contact ellipse is cut and an edge stress is generated at the upper end and as a result, this part could be worn at an early stage or peeled and the like.

Meanwhile, the spherical roller in the row positioned closer to the blade 3 is low-loaded, so that sliding is generated between the spherical roller 7, and track surfaces 5a and 6a of the inner ring and outer ring 5 and 6, causing surface damage and abrasion. Although it is considered to increase the size of the bearing in order to correspond to the high load, it is a waste for the spherical roller on the low-loaded side.

DISCLOSURE OF THE INVENTION

It is an object of the present invention to provide an economical double row self-aligning roller bearing that can implement appropriate support according to a load at each row and extend a substantial life and does not waste its material, and a main shaft support structure of a wind power generator using the above bearing.

It is another object of the present invention to provide a double row self-aligning roller bearing that can extend the life of a highly-loaded spherical roller especially.

According to one aspect, a double row self-aligning roller bearing in the present invention is provided such that spherical rollers are arranged in double rows between inner and outer track rings and it is characterized as follows. That is, when it is assumed that the length of the spherical roller in one row is L1, the length of the spherical roller in the other row is L2, and the length of the longer axis of a contact ellipse generated on the contact surface between the spherical roller in the other row and the track ring is A, the relation such that $L2 < L1$ and $L2 > A$ is satisfied.

As describe above, when the lengths of the spherical rollers in the right and left rows are differentiated, the load capacities of the spherical rollers become different. Therefore, when the longer spherical roller is used in a highly-loaded row and the shorter spherical roller is used in a low-loaded row, an appropriate support in accordance with the load can be implemented at each row, so that the bearing life can be extended. However, as for the spherical roller positioned in the low-loaded row, there is a limit to shortening of the roller length.

That is, the roller length capable of supporting the load sufficiently in use is needed. Thus, according to the present invention, the roller length of the spherical roller is positioned in the low-loaded row designed to be larger than the length of the major axis of a contact ellipse generated on the contact surface between the spherical roller and the track surface. When the spherical roller has the length larger than the length of the major axis of the contact ellipse, it can sufficiently endure the load in use and has a long life.

When the spherical roller and the track surface of the track ring receive the load, their contact surface is elastically deformed and an elliptic contact surface is generated around the contact point. This elliptic contact surface is the "contact ellipse".

The outer ring may be a single ring or may comprise two divided outer rings arranged in an axial direction. When the outer ring has the divided structure, a clearance is provided between the two divided outer rings and a pressure may be previously applied to the clearance between the two divided outer rings. The previous pressure is preferably applied from the side of the shorter spherical roller. The spherical roller may be a symmetric roller in which the maximum diameter of the roller is positioned in the center of the roller length, or it may be an asymmetric roller in which the maximum diameter of the roller is not positioned in the center of the roller length.

A main shaft support structure of a wind power generator according to the present invention comprises a blade receiving wind power, a main shaft having one end fixed to the blade and rotating with the blade, and a double row self-aligning roller bearing incorporated in a fixing member and supporting the main shaft rotatably. Focusing on the length of the self-aligning roller bearing, when it is assumed that the length of the spherical roller in a row positioned farther from the blade is $L_1$, the length of the spherical roller in a row positioned closer to the blade is $L_2$, and the length of the longer axis of a contact ellipse generated on the contact surface between the spherical roller in the row positioned closer to the blade and a track ring is A, the relation such that $$L_2 < L_1 \text{ and}$$

$$L_2 > A$$

is satisfied.

According to the bearing for supporting the main shaft of the wind power generator, a radial load and a high thrust load are applied to the spherical roller in the row positioned farther from the blade. Meanwhile, only a radial load is applied to the spherical roller in the row positioned closer to the blade. According to the present invention, since the longer spherical roller is used in the highly-loaded row and the shorter spherical roller is used in low-loaded row, appropriate support according to the load can be implemented in each row. The shorter spherical roller in the low-loaded row has to have a length so as to endure the excessive radial load in the windless state in which the wind mill stands still. Thus, the length of the shorter spherical roller positioned in the row closer to the blade is larger than the length of the major axis of the contact ellipse generated on the contact surface between the spherical roller and the track surface of the track ring.

As described above, according to the double row self-aligning roller bearing in the present invention, since the lengths of the spherical rollers in the right and left rows are differentiated and the length of the spherical roller in the row positioned closer to the blade is set to be larger than the length of the major axis of the contact ellipse, appropriate support according to the load can be implemented in each row, so that its substantial life can be extended. In addition, when the above double row self-aligning roller bearing is used in the main shaft supporting structure of the wind power generator, since appropriate support corresponding to the characteristics applied to the main shaft can be implemented, the main shaft support structure has high reliability and long life.

According to another aspect, a double row self-aligning roller bearing is provided such that spherical rollers are arranged in double rows between an inner ring and an outer ring, and it is characterized as follows. That is, when it is assumed that the curvature radius of the ridge line of the spherical roller in one row is $R_1$, the curvature radius of the ridge line of the spherical roller positioned in the other row is $R_2$, the curvature radius of the inner ring track surface being in contact with the spherical roller in one row is $N_1$, and the curvature radius of the inner ring track surface being in contact with the spherical roller in the other row is $N_2$, a relation such that $$N_1/R_1 > N_2/R_2$$

is satisfied.

According to the self-aligning roller bearing, the curvature radius N of the inner ring track surface is larger than the curvature radius R of the ridge line of the spherical roller in general. When the ratio N/R is relatively small and it is close to 1, the contact ellipse becomes large at the time of operation, while a maximum load stress becomes small at the contact part. Meanwhile, when the value of N/R is relatively great, the contact ellipse at the time of operation becomes small, while the maximum load stress becomes great at the contact part. Therefore, when the ratios N/R in the right and left rows are differentiated, appropriate surface pressure according to the load can be controlled in each row.

When the ratio N/R in the row on the highly-loaded side is relatively small, the edge stress in the vicinity of both ends of the self-aligning roller becomes great, so that this part could be worn at an early stage and peeled. Thus, the ratio N/R in the highly-loaded row is relatively increased to reduce the edge stress.

The sliding between the spherical roller and the track surface is likely to occur in the low-loaded row and the roller is likely to be skewed. Thus, the ratio N/R in the low-loaded row is relatively reduced to increase the size of the contact ellipse, so that the skew is prevented from being generated.

In order to change the ratio N/R, the curvature radiuses of the ridge lines of the spherical rollers in the right and left rows are to be differentiated or the curvature radiuses of the inner ring track surface in the right and left rows are to be differentiated. Alternatively, both curvature radiuses of the ridge lines of the spherical rollers and curvature radiuses of the inner ring track surfaces may be differentiated. Thus, according to one embodiment, the curvature radius $R_1$ of the spherical roller in one row is smaller than the curvature radius $R_2$ of the spherical roller in the other row. According to another embodiment, the curvature radius $N_1$ of the inner ring track surface being in contact with the spherical roller in one row is larger than the curvature radius $N_2$ of the inner ring track surface being in contact with the spherical roller in the other row.

Preferably, the spherical roller in one row having the curvature radius $R_1$ has a length longer than that of the spherical roller in the other row having the curvature radius $R_2$. In this constitution, the edge stress of the longer spherical roller in the highly-loaded row can be reduced and the shorter spherical roller in the low-loaded row can be effectively prevented from being skewed.

The double row self-aligning roller bearing having the above characteristics can be applied to the case where unequal loads are applied to spherical rollers in right and left rows, for example.

A main shaft support structure of a wind power generator according to the present invention comprises a blade receiving wind power, a main shaft having one end fixed to the blade and rotating with the blade, and a double row self-aligning roller bearing incorporated in a fixing member and supporting the main shaft rotatably. The double row self-aligning roller bearing comprises an inner ring, an outer ring, and spherical rollers in double rows. When it is assumed that the curvature radius of the ridge line of the spherical roller in the row positioned farther from the blade is R1, the curvature radius of the ridge line of the spherical roller in the row positioned closer to the blade is R2, the curvature radius of the inner ring track surface in the row positioned farther from the blade is N1, and the curvature radius of the inner ring track surface in the row positioned closer to the blade is N2, a relation such that $$N1/R1 > N2/R2$$

is satisfied.

According to the bearing that supports the main shaft of the wind power generator, the high thrust load as well as the radial load is applied to the spherical roller in the row positioned farther from the blade due to the influence of the wind pressure to the blade. Meanwhile, only the radial load is applied to the spherical roller in the row positioned closer to the blade. According to the present invention, since the size of the contact ellipse generated on the contact part between the spherical roller in the highly-loaded row and the inner ring track surface is reduced to reduce the edge stress at both ends of the spherical roller, and the size of the contact ellipse generated between the spherical roller in the low-loaded row and the inner ring track surface is increased to effectively prevent the skew of the spherical roller, appropriate support according to the load can be implemented in each row.

As described above, according to the double row self-aligning roller bearing of the present invention, since the ratios of the curvature radiuses of the ridge lines in the right and left rows to the curvature radiuses of the inner ring track surfaces are differentiated, appropriate support according to the load can be implemented in each row and a substantial life can be extended. In addition, when the above double row self-aligning roller bearing is used in the main shaft support structure of the wind power generator, since appropriate support corresponding to the characteristics applied to the main shaft can be implemented, the main shaft support structure has high reliability and long life.

According to still another aspect, a double row self-aligning roller bearing according to the present invention is such that spherical rollers are arranged in double rows between an inner ring and an outer ring and it is characterized as follows. That is, the inner ring has a center rib abutting on the end surfaces of the spherical rollers in double rows. The end surface of each spherical roller abutting on the center rib has a convex spherical configuration, and the center rib has at least a flat side surface of both side surfaces abutting on the end surfaces of the spherical rollers in double rows.

In this constitution, since the flat side surface of the center rib and the spherical roller are contacted at a point, the contact area becomes small, so that the friction resistance is reduced and torque becomes low. Therefore, the life of the spherical roller provided in the highly-loaded row during the operation can be extended.

According to one embodiment, one side surface of the center rib is a concave curved surface matched to the convex spherical configuration of the spherical roller, and the other side surface thereof is a flat surface. According to this embodiment, as for the spherical roller in one row abutting on the concave curved surface of the center rib, since the contact area is increased and it is in contact with the center rib at the upper part of the center rib, the roller can be restrained widely, so that the skew of the roller can be effectively prevented. Meanwhile, as for the spherical roller in the other row abutting on the flat side surface of the center rib, a point contact is provided, so that the friction resistance can be lowered.

In the above embodiment, it is preferable that one spherical roller abutting on the concave curved surface of the center rib has a length smaller than that of the other spherical roller abutting on the flat surface of the center rib. Thus, when the lengths of the spherical rollers in the right and left rows are differentiated, the load capacities of the spherical rollers become different. Therefore, when the longer spherical roller is used in the highly-loaded row and the shorter spherical roller is used in the low-loaded row, appropriate support in accordance with the load can be implemented in each row. When the roller length is reduced, the roller is likely to be skewed, but when the shorter spherical roller and the side surface of the center rib are contacted widely, the skew can be effectively prevented.

The spherical roller may be a symmetric roller in which the maximum diameter of the roller is positioned in the center of the roller length, or may be an asymmetric roller in which the maximum diameter of the roller is not positioned in the center of the roller length. When the roller is the asymmetric roller in which the maximum diameter of the roller is shifted from the center of the roller length toward the center rib, since component force pressing the roller toward the center rib side in use is generated, the skew of the roller can be effectively prevented.

Preferably, the height of the side surface of the center rib having the flat surface is designed so as to be larger than the diameter of the contact ellipse in a height direction generated on the contact surface between the side surface and the end surface of the spherical roller. The center rib having the above height dimension can sufficiently endure the load in use.

The double row self-aligning roller bearing having the above characteristics is used in the case where unequal loads are applied to the spherical rollers in the right and left rows.

A main shaft support structure of a wind power generator according to the present invention comprises a blade receiving wind power, a main shaft having one end fixed to the blade and rotating with the blade, and a double row self-aligning roller bearing incorporated in a fixing member and supporting the main shaft rotatably. The double row self-aligning roller bearing comprises an inner ring, an outer ring, and spherical rollers in double rows. The inner ring has a center rib abutting on the end surfaces of the spherical rollers in double rows. The end surface of each spherical roller abutting on the center rib has a convex spherical configuration, and the center rib has a concave curved surface matched to the convex spherical configuration of the spherical roller as one side surface, and a flat surface as the other side surface.

According to the main shaft support structure of the wind power generator having the above constitution, since the spherical roller in the highly-loaded row and the center rib are contacted at a lower torque and the spherical roller in the low-loaded row and the center rib are contacted in a larger contact area, appropriate support corresponding to the load can be implemented.

As described above, according to the double row self-aligning roller bearing in the present invention, since the side surface of the center rib and the spherical roller are contacted at a point, the contact surface pressure between them is lowered to a low torque. In addition, the flat side surface has the advantage that the position of the contact point can be easily controlled by an angle. Even when an excessive load is applied to the center rib, since the contact ellipse will not come off the center rib side surface, an edge stress can be prevented from being generated. Thus, the life of the spherical roller to which a high load is applied when used can be extended.

According to the present invention, appropriate support according to the load can be implemented in each row, so that the substantial life can be extended. When the above double row self-aligning roller bearing is applied to the main shaft supporting structure of the wind power generator, since appropriate support according to the characteristics applied to the main shaft can be implemented, the main shaft structure is highly reliable and has a long life.

BEST MODE FOR CARRYING OUT THE INVENTION

Figure 1:
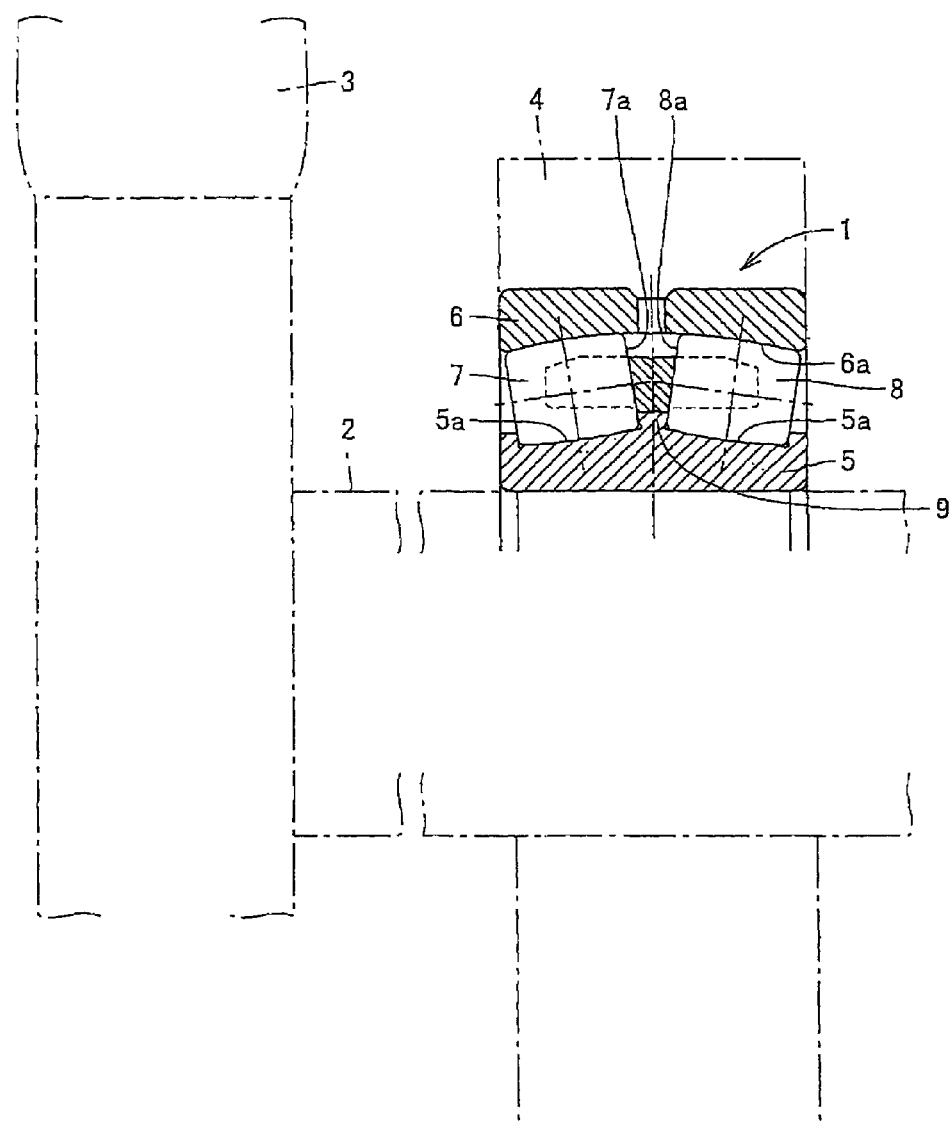
FIG. 1 is a sectional view showing a conventional example of a main shaft support bearing of a wind power generator.
Figure 2:
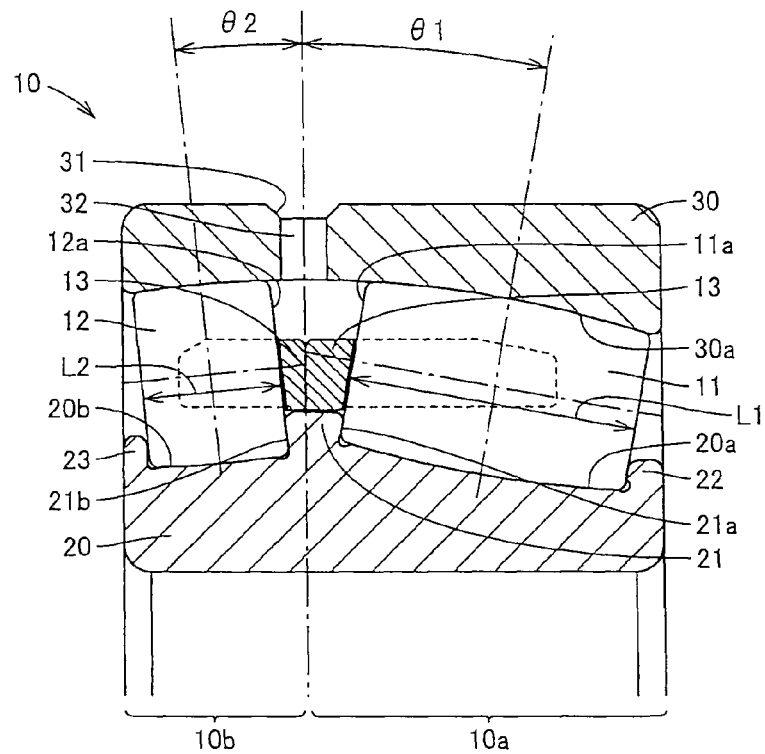
FIG. 2 is a sectional view showing a double row self-aligning roller bearing according to one embodiment of the present invention.

A double row self-aligning roller bearing according to one embodiment of the present invention will be described with reference to FIGS. 2 and 3.

A double row self-aligning roller bearing 10 comprises an inner ring 20, an outer ring 30, spherical rollers 11 and 12 arranged in double rows between both track rings, and a retainer 13 retaining the spherical rollers 11 and 12. The retainer 13 is provided separately for each row. A track surface 30a of the outer ring 30 is formed into a spherical shape and the outer peripheral surface of each of the spherical rollers 11 and 12 has a spherical configuration so as to follow the track surface 30a of the outer ring 30.

The outer ring 30 has an oil groove 31 at the middle position in its outer diameter surface and further has an oil hole 32 penetrating from the oil groove 31 to its inner diameter surface. The oil hole 32 is provided at one or more positions in the circumferential direction.

The inner ring 20 according to the illustrated embodiment has outer flanges 22 and 23 on both ends in a width direction, and also has a center rib 21 in the middle part thereof. In addition, an inner ring having no flange may be used in another embodiment. The inner ring 20 has double row track surfaces 20a and 20b each having a sectional configuration following the outer peripheral surface of each of the spherical rollers 11 and 12.

Focusing on the lengths of the spherical rollers 11 and 12 in right and left rows, a length L1 of the spherical roller 11 on the right side in the drawing is longer than a length L2 of the spherical roller 12 on the left side. In addition, according to the illustrated embodiment, bearing parts 10a and 10b of the right and left rows have different contact angles θ1 and θ2, respectively. In this case, the contact angle θ1 of the bearing part 10a corresponding to the row of the longer spherical roller 11 is set larger than the contact angle θ2 of the bearing part 10b of the row of the shorter spherical roller 12.

As for the outer diameters of both spherical rollers 11 and 12, their maximum diameters are the same, for example. As a variation, the outer diameters of the spherical rollers 11 and 12 in both rows may be differentiated. For example, the longer spherical roller 11 may have a larger outer diameter than that of the shorter spherical roller 12. As for each of the configurations of the spherical roller 11 and 12 in both rows, it may be a symmetrical roller in which the position of the maximum diameter of the roller is positioned in the center of the roller length or may be an asymmetrical roller in which the position of the maximum diameter of the roller is not positioned in the center.

Figure 3:
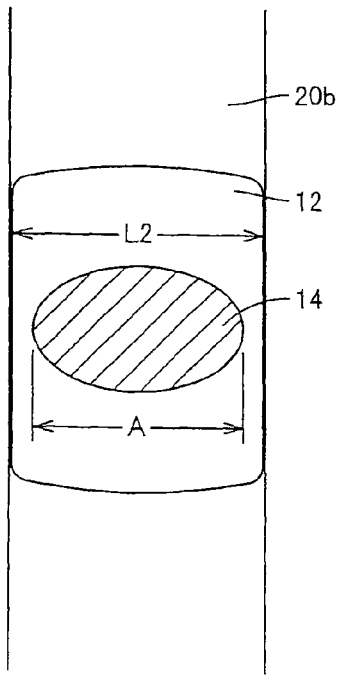
FIG. 3 is a schematic view showing a contact ellipse generated on the contact surface between a shorter spherical roller and an inner ring track surface.

FIG. 3 schematically shows the state in which the spherical roller 12 having the smaller length L2 is positioned on the track surface 20b of the inner ring 20. When the load is applied to the spherical roller 12 and the inner ring 20, the contact surface between them is elastically deformed and an elliptic contact surface, that is, a contact ellipse 14 is generated around their contact point. Although it is not shown, a similar contact ellipse 14 is also generated on the contact surface between the spherical roller 12 and the track surface 30a of the outer ring 30. The length L2 of the spherical roller 12 is designed so as to be longer than the length of the major axis of the contact ellipse 14.

The double row self-aligning roller bearing 10 having the above constitution is used in a case where the thrust load and radial load are applied to one row and only the radial load is applied to the other row, for example. In this case, the longer spherical roller 11 is used on the side on which the thrust load and radial load are applied and the shorter spherical roller 12 is used on the side on which only the radial load is applied.

As described above, when the longer spherical roller 11 is arranged in the highly-loaded row and the shorter spherical roller 12 is arranged in the low-loaded row, support appropriate for the loaded situation of each row can be implemented. More specifically, since a load facility is high in the highly-loaded row, a rolling fatigue life is extended. In addition, since the contact stress between the shorter spherical roller 12, and the track surfaces 30a and 20b is increased in the low-loaded row and the self-weight of the roller is reduced, sliding is reduced.

Furthermore, according to the shorter spherical roller 12, since its roller length L2 is longer than the length of the longer axis A of the contact ellipse 14, it is sufficiently durable for the radial load when used.

Figure 4:
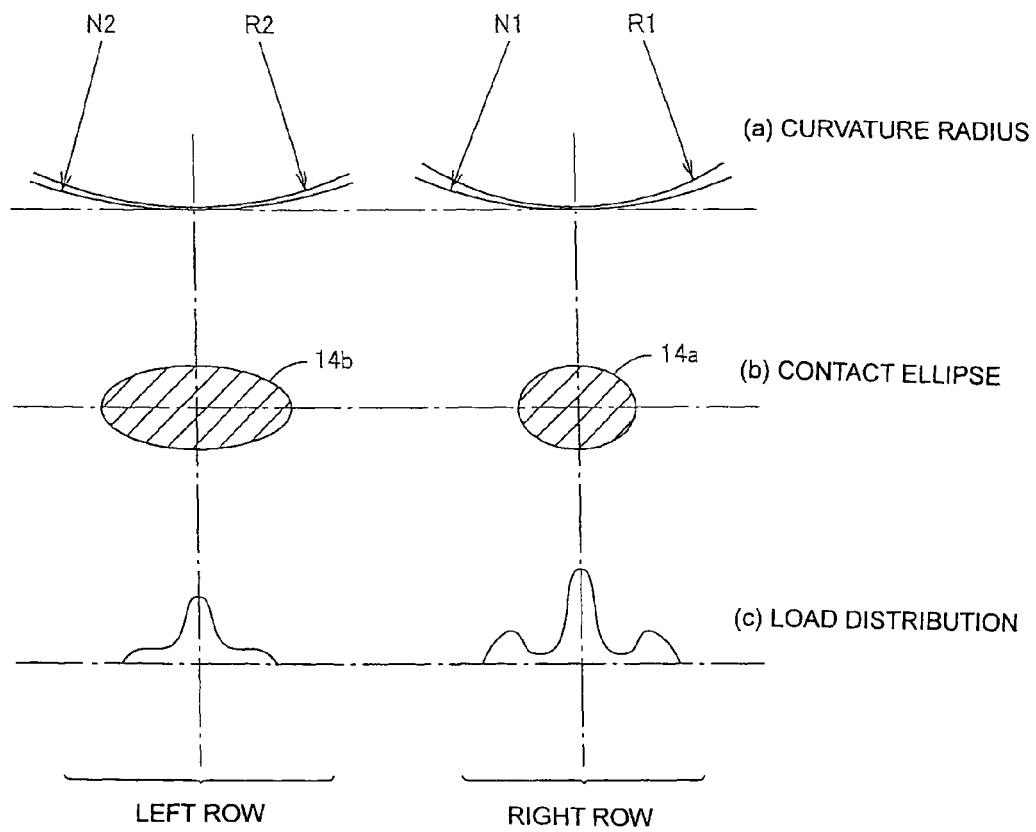
FIG. 4 is a view for explaining the relation between the spherical roller in each row and the inner ring track surface, in which (a) schematically shows the state in which the spherical roller abuts on the inner ring track surface, (b) shows the contact ellipse generated at the contact part between the spherical roller and the inner ring track surface, and (c) shows a load distribution at both ends of the spherical roller.

FIG. 4 is a view for explaining the relation between the spherical roller in each row and the inner ring track surface being in contact with it, and showing a substantial part of the preferred embodiment. FIG. 4(a) schematically shows the state in which the spherical roller is in contact with the inner ring track surface, FIG. 4(b) shows the contact ellipse generated at the contact part between the spherical roller and the inner ring track surface, and FIG. 4(c) shows a load distribution at both ends of the spherical roller.

As shown in FIG. 4(a), when it is assumed that the curvature radius of the ridge line of the longer spherical roller in the right row is R1, the curvature radius of the ridge line of the shorter spherical roller in the left row is R2, the curvature radius of the inner ring track surface in the right row is N1, and the curvature radius of the inner ring track surface in the left row is N2, the following dimensional relation is to be satisfied.

$$N1/R1 > N2/R2$$

In order to implement the above dimensional relation, any of the following designs is to be implemented.
(1) The curvature radiuses of the ridge lines of the spherical rollers 11 and 12 in the right and left rows are differentiated. According to the illustrated embodiment, the curvature radius R1 of the longer spherical roller in the right row is designed so as to be smaller than the curvature radius R2 of the shorter spherical roller in the left row.
(2) The curvature radiuses of the inner ring track surfaces 20a and 20b in the right and left rows are differentiated. According to the illustrated embodiment, the curvature radius of the inner ring track surface 20a in the right row is designed so as to be larger than that of the inner ring track surface 20b in the left row.
(3) The above (1) and (2) are both implemented.

When the spherical roller and the inner ring track surface receive a load, their contact surface is elastically deformed and the elliptic contact surface is generated around the contact point. This elliptic contact surface is the contact ellipse. When the ratio N/R of the curvature radius N of the inner ring track surface to the curvature radius R of the ridge line of the spherical roller is relatively small and it is close to 1, the contact ellipse at the time of operation is large. Meanwhile, when the value of N/R is relatively great, the contact ellipse at the time of operation is small.

Therefore, as shown in FIG. 4(b), a contact ellipse 14a generated at the contact part between the longer spherical roller 11 in the right row and the inner ring track surface 20a in the right row is relatively small. When the contact ellipse 14a becomes small, the edge load at both ends of the spherical roller 11 is reduced as shown in the load distribution in FIG. 4(c).

A contact ellipse 14b generated at the contact part between the shorter spherical roller 12 in the left row and the inner ring track surface 20b in the left row is relatively large. When the contact ellipse 14b becomes large, since the driving force of the roller transmitted from the inner ring is increased, the roller behavior comes to be stable. In addition, since a part that becomes the rotation axis of the skew is large, friction resistance prevents the skew.

In order to reduce the edge stress of the longer spherical roller 11 in the highly-loaded row, since the ratio N1/R1 of the curvature radius N1 of the inner ring track surface 20a to the curvature radius R1 of the ridge line of the spherical roller 11 is set to be relatively great to reduce the size of the contact ellipse, the life of the spherical roller in the highly-loaded row can be expected to be extended. As for the shorter spherical roller 12 in the low-loaded, since the ratio N2/R2 of the curvature radius N2 of the inner ring track surface 20b to the curvature radius R2 of the ridge line of the spherical roller 12 is set to be relatively small to increase the size of the contact ellipse and increase the friction resistance against the skew, it is effectively prevented from being skewed.

Figure 5:
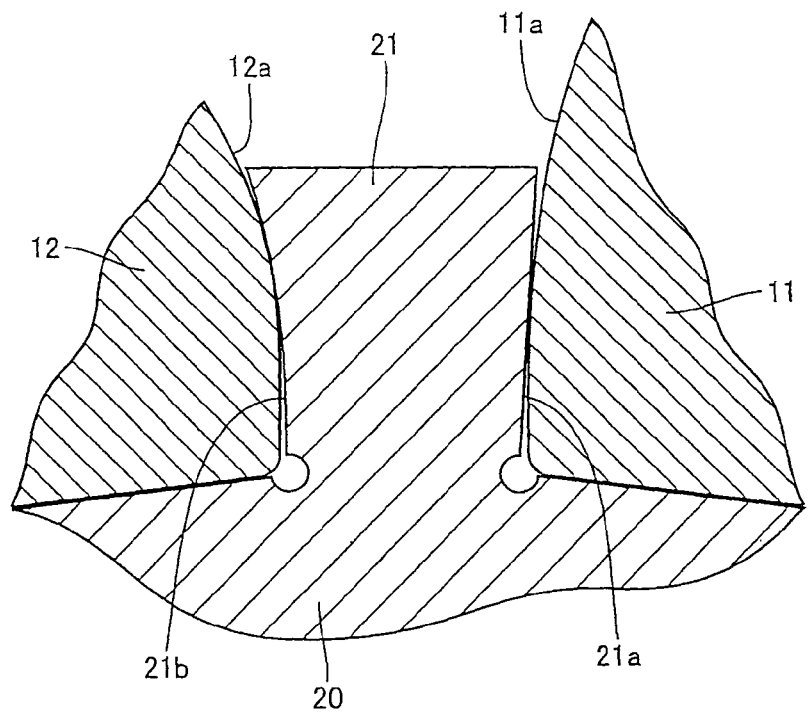
FIG. 5 is an enlarged sectional view showing the abutting part between a center rib of the inner ring and the spherical rollers in right and left rows.

FIG. 5 is an enlarged view showing the state in which the center rib 21 of the inner ring 20 abuts on the spherical rollers 11 and 12 in the right and left rows. As shown in FIG. 5, end surfaces 11a and 12a of the spherical rollers 11 and 12 abutting on the center rib 21 have convex spherical configurations.

The center rib 21 has one flat side surface of both side surfaces 21a and 21b abutting on the spherical rollers 11 and 12 in the right and left rows. According to the illustrated embodiment, one side surface 21b of the center rib 21 is a concave curved surface matched to the convex spherical configuration of one spherical roller 12 and the other side surface 21a thereof abutting on the other spherical roller 11 is a flat surface.

Although the shorter spherical roller 12 is likely to be skewed, since the contact area between the spherical roller 12 and the center rib 21 is large because of the contact between the end surface 12a having the convex spherical configuration and the side surface 21b having the concave curved surface, the skew can be effectively prevented. Meanwhile, as for the other spherical roller 11 in the highly-loaded row, since the end surface 11a of the convex spherical configuration and the flat side surface 21a are designed so as to be contacted at a point, the contact surface pressure can be reduced and torque at the contact part can be low.

Figure 6:
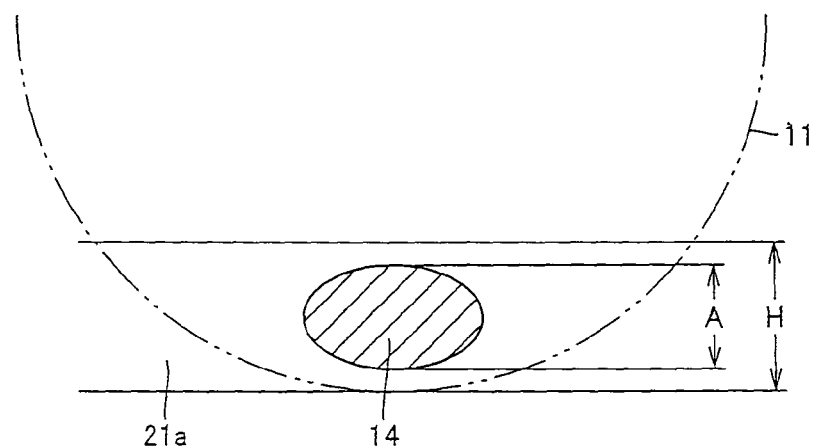
FIG. 6 is a schematic view showing the state in which the end surface of the spherical roller and the flat side surface of the center rib are contacted.

FIG. 6 schematically shows the state in which the end surface 11a of the spherical roller 11 and the flat side surface 21a are in contact with each other. When the end surface 11a of the spherical roller 11 and the flat side surface 21a receive a load and come in contact with each other, the contact surface is elastically deformed and the elliptic contact surface, that is, the contact ellipse 14 is generated around the contact point. Preferably, in order to keep the edge load at the upper end of the side surface 21a of the center rib 21 low, the height H of the side surface 21a of the center rib 21 is designed so as to be larger than a diameter A of the contact ellipse 14 in the height direction.

Figure 7:
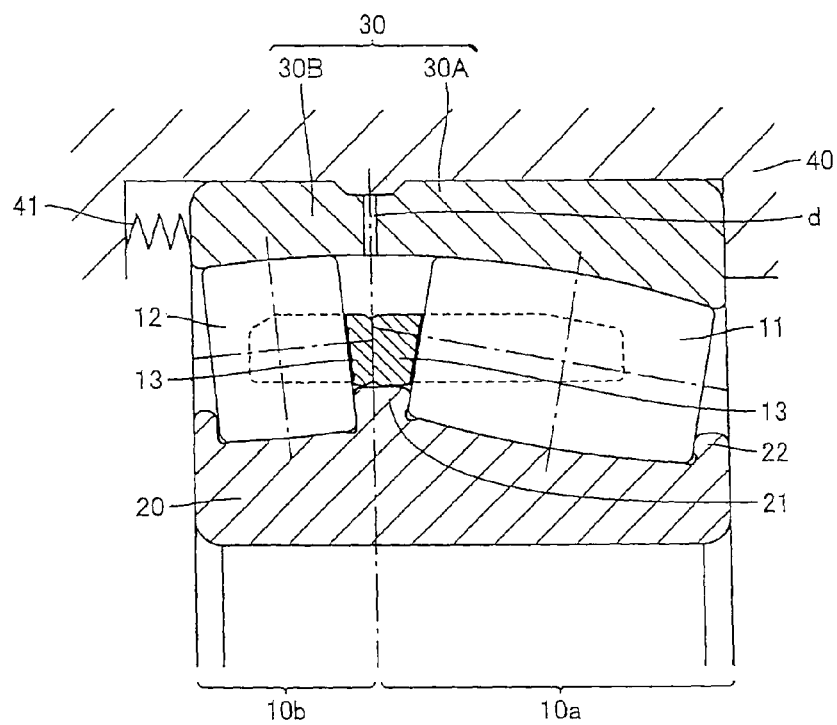
FIG. 7 is a sectional view showing a double row self-aligning roller bearing according to another embodiment of the present invention.

FIG. 7 shows a self-aligning roller bearing according to another embodiment of the present invention. In addition, since the same reference numeral as that in the embodiment shown in FIG. 2 shows the same or corresponding component, its detailed description will be omitted. According to the embodiment shown in FIG. 7, an outer ring 30 comprises two divided outer rings 30A and 30B arranged in an axial direction. Both divided outer rings 30A and 30B are provided such that a clearance "d" is provided between them in a natural state, that is, state in which the track surfaces of both divided outer rings are on the same spherical surface.

As shown in FIG. 7, it is preferable that the clearance between both divided outer rings 30A and 30B is previously compressed by compressing means 41 so as to become narrow. The previously compressing means 41 includes a spring member, a tightening screw and the like. When the spring member is used, compression springs are arranged at a plurality of positions in the circumferential direction so as to be in contact with the end surface of the outer ring 30B. It is preferable that the previously compressing means 41 applies a pressure from the side of a shorter spherical roller 12.

As described above, when the outer ring 30 has the divided structure, the outer ring 30 having an asymmetric configuration can be easily manufactured. Furthermore, since the outer ring 30 is previously compressed, the shorter spherical roller 12 is actively prevented from sliding. Furthermore, in addition to the divided structure of the outer ring, an inner ring may comprise two divided inner rings arranged in the axial direction. Thus, the asymmetric inner ring 20 can be easily manufactured.

Figure 8:
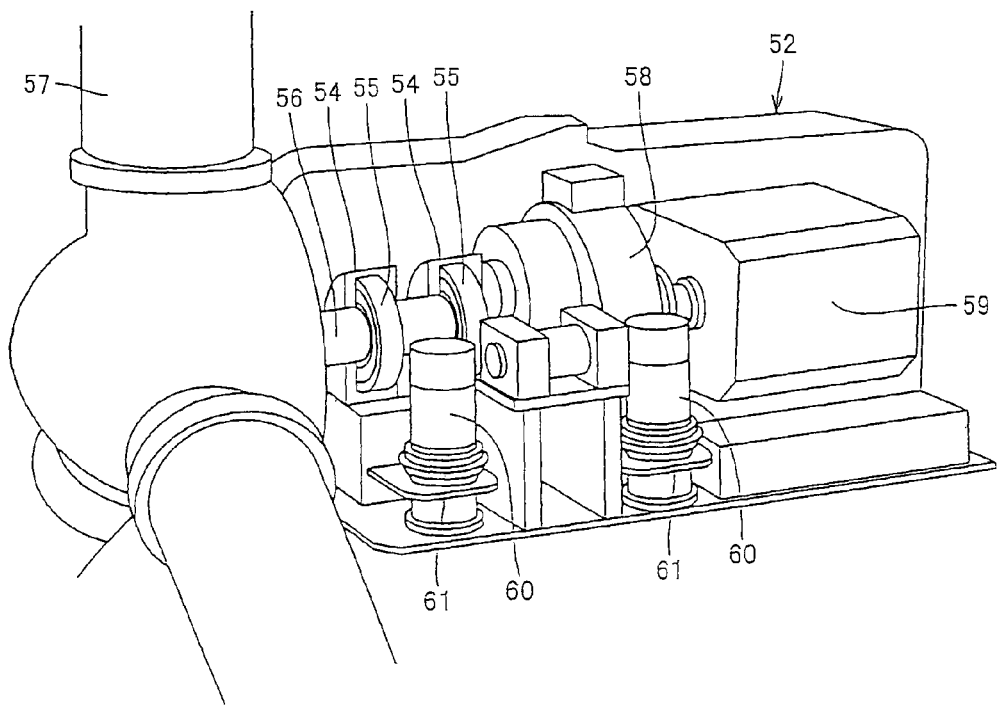
FIG. 8 is a view showing one example of a main shaft support structure of a wind power generator using the double row self-aligning roller bearing according to the present invention.
Figure 9:
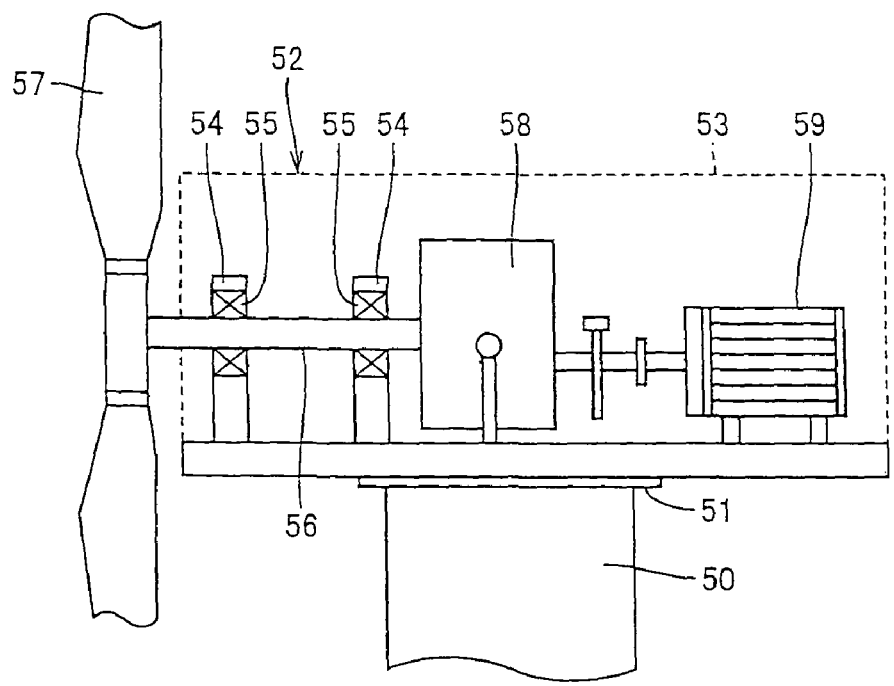
FIG. 9 is a schematic side view showing the main shaft support structure of the wind power generator shown in FIG. 8.

FIGS. 8 and 9 show an example of a main shaft support structure of a wind power generator to which the double row self-aligning roller bearings according to the embodiments of the present invention shown in FIGS. 2 to 7 are applied. A casing 53 of a nacelle 52 supporting the main part of the main shaft support structure is set on a support table 50 through a rotation seat bearing 51 so as to be horizontally turnable at a high position. A main shaft 56 holding a blade 57 at one end is rotatably supported in the casing 53 of the nacelle 52 through a main shaft support bearing 55 incorporated in a bearing housing 54. The other end of the main shaft 56 is connected to a speed-up gear 58 and the output shaft of this speed-up gear 58 is connected to the rotor shaft of a power generator 59. The nacelle 52 is turned at any angle by a swivel motor 60 through a speed-down gear 61.

Although the two main shaft support bearings 55 are arranged in the illustrated embodiment, the number thereof may be one. The double row self-aligning roller bearing according to the embodiment of the present invention is applied to the main shaft support bearing 55. In this case, since a high load is applied to the spherical roller positioned farther from the blade, the longer spherical roller is used here. Since only a radial load is applied mainly to the spherical roller positioned closer to the blade 57, the shorter spherical roller is used here.

While the windmill of the wind power generator stands still in a windless state, a high radial load is applied. In order to endure this load, the length of the spherical roller positioned in the row closer to the blade is designed so as to be longer than the length of the major axis of the contact ellipse generated on the contact surface between the spherical roller and the track ring.

Furthermore, when it is assumed that the curvature radius of the ridge line of the spherical roller in the row positioned farther from the blade is R1, the curvature radius of the ridge line of the spherical roller in the row positioned closer to the blade is R2, the curvature radius of the inner ring track surface in the row positioned farther from the blade is N1, and the curvature radius of the inner ring track surface in the row positioned closer to the blade is N2, the following dimensional relation is to be satisfied.

$$N1/R1 > N2/R2$$

Although the lengths of the spherical rollers in the right and left rows are differentiated in the above embodiments, the length of the spherical rollers in the right and left rows may be the same in another embodiment.

Furthermore, it is preferable that the end surface of each spherical roller has a convex spherical configuration. The inner ring of the main shaft support bearing 55 has a center rib abutting on the end surfaces of the double row spherical rollers. According to the center rib, one side surface facing the blade 57 has a concave curved surface matched to the convex spherical configuration of the spherical roller and the other side surface on the opposite side has a flat surface.

Although the embodiments of the present invention have been described with reference to the drawings in the above, the present invention is not limited to the above-illustrated embodiments. Various kinds of modifications and variations may be added to the illustrated embodiments within the same or equal scope of the present invention.

INDUSTRIAL APPLICABILITY

The present invention can be advantageously applied to a double row self-aligning roller bearing in which unequal loads are applied to the spherical rollers in the right and left rows, and a main shaft support structure of a wind power generator comprising the above bearing.

The invention claimed is:

1. A double row self-aligning roller bearing in which spherical rollers are arranged in double rows between an inner ring and an outer ring, characterized in that
   the curvature radius of the ridge line of the spherical roller in one row is R1, the curvature radius of the ridge line of the spherical roller positioned in the other row is R2, the curvature radius of the inner ring track surface being in contact with the spherical roller in one row is N1, and the curvature radius of the inner ring track surface being in contact with the spherical roller in the other row is N2, a relation such that $$N1/R1 > N2/R2$$

is satisfied.

2. The double row self-aligning roller bearing according to claim 1, wherein
   the curvature radius R1 of said spherical roller in one row is smaller than the curvature radius R2 of said spherical roller in the other row.

3. The double row self-aligning roller bearing according to claim 1, wherein
   the curvature radius N1 of the inner ring track surface being in contact with said spherical roller in one row is larger than the curvature radius N2 of the inner ring track surface being in contact with said spherical roller in the other row.

4. The double row self-aligning roller bearing according to claim 1, wherein
   said spherical roller in one row having the curvature radius R1 has a length longer than that of said spherical roller in the other row having the curvature radius R2.

5. The double row self-aligning roller bearing according to claim 1, wherein
   the double row self-aligning roller bearing is used in a case where unequal loads are applied to the spherical rollers in the right and left rows.

6. A main shaft support structure of a wind power generator comprising:
   a blade receiving wind power;
   a main shaft having one end fixed to said blade and rotating with the blade; and
   a double row self-aligning roller bearing incorporated in a fixing member and supporting said main shaft rotatably,
   said double row self-aligning roller bearing comprising an inner ring, an outer ring, and spherical rollers in double rows, characterized in that the curvature radius of the ridge line of the spherical roller in the row positioned farther from the blade is R1, the curvature radius of the ridge line of the spherical roller in the row positioned closer to the blade is R2, the curvature radius of the inner ring track surface in the row positioned farther from the blade is N1, and the curvature radius of the inner ring track surface in the row positioned closer to the blade is N2, a relation such that $$N1/R1 > N2/R2$$

is satisfied.

7. A double row self-aligning roller bearing in which spherical rollers are arranged in double rows between an inner ring and an outer ring, characterized in that
    said inner ring has a center rib abutting on the end surfaces of said spherical rollers in double rows,
    the end surface of each spherical roller abutting on said center rib has a convex spherical configuration, and
    said center rib has at least a flat side surface of both side surfaces abutting on the end surfaces of said spherical rollers in double rows, characterized in that
    one side surface of said center rib is a concave curved surface matched to the convex spherical configuration of said spherical roller, and the other side surface thereof is a flat surface.

8. The double row self-aligning roller bearing according to claim 7, wherein
    one spherical roller abutting on the concave curved surface of said center rib has a length smaller than that of the other spherical roller abutting on the flat surface of said center rib.

9. The double row self-aligning roller bearing according to claim 7, wherein
    said each spherical roller is an asymmetric roller in which the maximum diameter of the roller is shifted from the center of the roller length toward the center rib.

10. The double row self-aligning roller bearing according to claim 7, wherein
    the height of the side surface of said center rib having the flat surface is designed so as to be larger than the diameter of the contact ellipse in a height direction generated on the contact surface between the side surface and the end surface of the spherical roller.

11. The double row self-aligning roller bearing according to claim 7, wherein
    the double row self-aligning roller bearing is used in a case where unequal loads are applied to the spherical rollers in the right and left rows.

\* \* \* \* \*